(12) United States Patent
Ashizawa et al.

(10) Patent No.: US 8,027,233 B2
(45) Date of Patent: Sep. 27, 2011

(54) OPTICAL DISK DEVICE

(75) Inventors: Tetsuo Ashizawa, Kanagawa (JP); Hiromi Honma, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/801,427

(22) Filed: Jun. 8, 2010

(65) Prior Publication Data
US 2011/0051576 A1    Mar. 3, 2011

(30) Foreign Application Priority Data
Aug. 28, 2009   (JP) ................................. 2009-198525

(51) Int. Cl.
  *G11B 7/00*   (2006.01)
(52) U.S. Cl. ............... 369/47.17; 369/53.31; 369/47.22; 369/53.41; 369/47.27
(58) Field of Classification Search ......................... None
See application file for complete search history.

(56) References Cited

U.S. PATENT DOCUMENTS

| 7,245,573 B2 * | 7/2007 | Eom ......................... 369/53.34 |
| 2002/0105870 A1 * | 8/2002 | Hikima ..................... 369/47.25 |

FOREIGN PATENT DOCUMENTS

| JP | 2002-150564 | 5/2002 |
| JP | 2007-59018 | 3/2007 |

* cited by examiner

*Primary Examiner* — Jorge Ortiz Criado
(74) *Attorney, Agent, or Firm* — McGinn IP Law Group, PLLC

(57) ABSTRACT

An LPP detection unit detects an LPP from a wobble signal. A correction unit obtains a difference set by performing processing of calculating a difference in signal level between an LPP-present sync pattern portion and a non-LPP sync pattern portion having the same polarity, and executes correction on an RF signal at a timing when the LPP is detected, by using the difference set. The LPP-present sync pattern portion is a sync pattern portion obtained when the LPP is detected at the timing of the sync pattern portion positioned at the head of a sync frame of the RF signal. The non-LPP sync pattern portion is a sync pattern portion obtained when no LPP is detected at the timing of the sync pattern portion of the sync frame. In the case of reproducing information recorded on a DVD-R/RW optical disk, the occurrence of errors due to the effect of the LPP can be reduced.

16 Claims, 16 Drawing Sheets

FRAME STRUCTURE OF RF SIGNAL

OPTICAL DISK DEVICE

INCORPORATION BY REFERENCE

This application is based upon and claims the benefit of priority from Japanese patent application No. 2009-198525, filed on Aug. 28, 2009, the disclosure of which is incorporated herein in its entirety by reference.

BACKGROUND

1. Field of the Invention

The present invention relates to an optical disk device, and more particularly, to a technique for reproducing information recorded on an optical disk compliant with DVD-R and DVD-RW standards.

2. Description of Related Art

FIG. 16 shows a partial plan view of an optical disk compliant with DVD-R and DVD-RW (hereinafter, collectively referred to as "DVD-R/RW") standards. Referring to FIG. 16, the optical disk has a groove area in which user information is recorded, and an area between adjacent grooves is called a land. Although the grooves are meandering, the grooves and lands are each shown in a rectangular shape for convenience of illustration.

Each land has auxiliary information, such as a physical address, recorded as a land prepit (LPP). In the case of recording information to be reproduced (hereinafter, referred to as "reproduction information") on the optical disk, focused laser light is irradiated onto the disk surface, and the LPP is detected from a signal called a wobble signal which is obtained from the reflected light, thereby obtaining physical positional information of the optical disk. This makes it possible to record user information as an information mark at any position in the groove area. The meandering of each groove can be detected from the wobble signal, and a recording clock is generated from the wobble signal. Recording of the information mark in synchronization with the recording clock allows recording without causing any inconsistency even in the case of linking or overwriting data. Further, in the case of recording, laser power is increased and physical properties are changed by control of the temperature of a light focusing area, thereby forming the information mark.

During reproduction of the optical disk having the information mark recorded in the groove area, laser light is irradiated onto the groove, and a read signal containing reproduction information and synchronization information is obtained from the reflected light. During the reproduction, the laser light is oscillated with a smaller power than that required at the time of recording, to thereby prevent the information mark from being erased.

Note that the read signal obtained during the reproduction generally has a frequency higher than that of the wobble signal, and is called an RF signal.

FIG. 17 corresponds to FIG. 11 of Japanese Unexamined Patent Application Publication No. 2007-59018, and illustrates an example of a reproducing apparatus for reproducing an optical disk. The reproducing apparatus includes an A/D converter 11, an offset corrector 12, an asymmetry corrector 13, a PLL circuit 14, an error calculator 16, an optical head 17, an equalizer 19, a tap coefficient corrector 20, and a Viterbi decoder 21.

An optical disk 18 is rotated by a spindle motor (not shown) at a constant angular velocity or at a constant linear velocity. In the optical head 17, the distance between the disk surface and an objective lens and the radius positions of a groove and a focused light spot of the optical disk 18 are controlled by a servo circuit (not shown), and the focused light spot is irradiated onto the groove. The reflectance and polarization of the reflected light from the disk surface vary depending on the presence or absence of the information mark, and are detected by a detector (not shown) to thereby obtain an analog RF signal S1.

The A/D converter 11 performs A/D conversion on the analog RF signal S1, thereby obtaining a digitized RF signal S2. The offset corrector 12 performs offset correction for an output S2 of the A/D converter 11 based on an output of the error calculator 16. The asymmetry corrector 13 receives an output S3 of the offset corrector 12, detects asymmetry, and corrects the asymmetry. The PLL circuit 14 controls an output S4 of the asymmetry corrector 13 and a sampling clock of the A/D converter 11 to be synchronized in phase with the RF signal S1. There is also known a reproducing apparatus in which an AGC (not shown) performs a gain control for making the signal amplitude constant, before the output S4 of the asymmetry corrector 13 is supplied to the PLL circuit 14 and the equalizer 19.

The equalizer 19 equalizes the output S4 of the asymmetry corrector 13 by using a tap coefficient controlled by the tap coefficient corrector 20 so as to obtain a PR characteristic determined by the Viterbi decoder 21. When the SNR (signal-to-noise ratio) and channel characteristics of the input signal are substantially constant, the equalizer 19 may perform equalization using a fixed coefficient instead of using the tap coefficient from the tap coefficient corrector 20.

The Viterbi decoder 21 receives an output S5 of the equalizer 19 and performs maximum likelihood detection, for example, thereby obtaining detection data which is a channel bit data string.

The error calculator 16 receives the output S5 of the equalizer 19 and the detection data output from the Viterbi decoder 21, and outputs error information. Specifically, the error calculator 16 first converts the detection data into a signal (replica signal) expected as a corresponding input of the Viterbi decoder 21. Then, the error calculator 16 calculates a difference between the output S5 of the equalizer 19 and the replica signal, and outputs the difference only when the replica signal is located in the vicinity of the center of the reference level of the Viterbi decoder 21. The output serves as miscalculation information. The tap coefficient corrector 20 corrects the tap coefficient so that the difference between the output S5 of the equalizer 19 and the output of the error calculator 16 is minimized, and outputs the corrected tap coefficient to the equalizer 19.

SUMMARY

The present inventors have found a problem as follows. Generally, the diameter of a focused light spot emitted from an optical head (optical head 17 shown in FIG. 17) of a reproducing apparatus is greater than the width of a groove. Accordingly, an RF signal obtained by the reproducing apparatus may include a corresponding information mark as well as a signal corresponding to an LPP. If no measures are taken to eliminate the effect of the LPP as in the reproducing apparatus shown in FIG. 17, the RF signal, which is subjected to processing such as A/D conversion, still includes the effect of the LPP, and the RF signal including the effect of the LPP is supplied to the Viterbi decoder 21. This may cause a large number of errors.

A first exemplary aspect of the present invention is an optical disk device that reproduces reproduction information recorded in a groove of an optical disk compliant with DVD-R/RW standards. The optical disk device includes: a wobble signal generation unit that generates a wobble signal; an RF signal generation unit that reads information from the groove and generates an RF signal; an LPP detection unit that detects a land prepit (LPP) from the wobble signal; a difference calculation unit; and a correction execution unit.

The difference calculation unit calculates a difference set, assuming that a sync pattern portion obtained when the LPP detection unit detects the LPP is an LPP-present sync pattern portion and that a sync pattern portion obtained when the LPP detection unit detects no LPP is a non-LPP sync pattern portion, at a timing when the sync pattern portion is positioned at the head of a sync frame of the RF signal. The calculation of the difference set is processing of calculating a difference in signal level between the LPP-present sync pattern portion and the non-LPP sync pattern portion having the same polarity.

The correction execution unit executes correction on the RF signal at a timing when the LPP is detected by the LPP detection unit, by using a calculation result of the difference calculation unit.

Even when the optical disk device according to the first exemplary aspect of the invention is replaced with a system, a method, or a program for causing a computer to execute a part of processing of the optical disk device, it can still be effective as one aspect of the present invention.

According to the technique of the present invention, it is possible to reduce the occurrence of errors due to the effect of the LPP in the case of reproducing information recorded on a DVD-R/RW optical disk.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
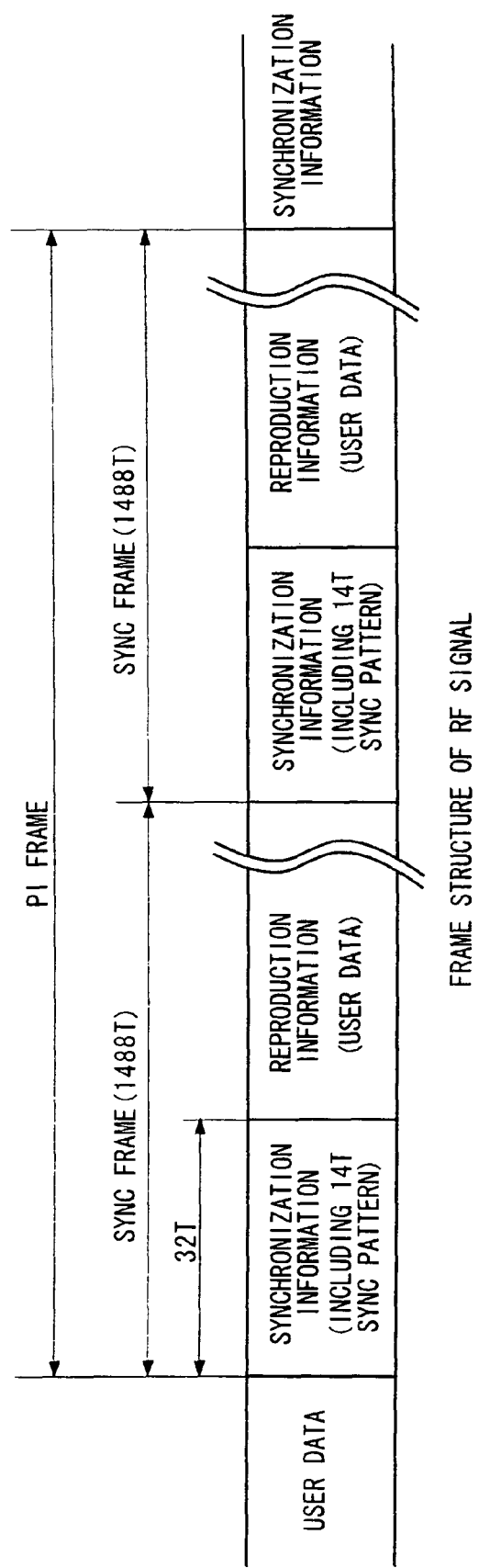
FIG. 1 is a diagram showing a frame structure of an RF signal.

Exemplary embodiments of the present invention will be described below with reference to the accompanying drawings. The following description and the drawings are omitted and simplified as appropriate to clarify the explanation. The elements illustrated in the drawings as functional blocks for performing various processes can be implemented hardware-wise by a CPU, a memory, and other circuits, and software-wise by a program loaded onto a memory or the like. Accordingly, it is to be understood by those skilled in the art that these functional blocks can be implemented in various forms including, but not limited to, hardware alone, software alone, and a combination of hardware and software.

Prior to a detailed description of the exemplary embodiments of the present invention, a description is first given of the principle of the technique according to the present invention.

FIG. 1 shows a frame structure of an RF signal obtained during reading of a groove in the case of reproducing a DVD-R/RW optical disk. The minimum unit of the RF signal is a sync frame. The sync frame has a length of 1488T (T: a cycle of a recording clock). A signal having a length corresponding to a period of 32T including 14T and located at the head of the sync frame indicates synchronization information, and the portion corresponding to 14T is hereinafter referred to as a 14T sync pattern portion. The portion of synchronization information is followed by user data representing reproduction information. Two consecutive sync frames to which a 10-byte PI parity is appended per 172-byte data are hereinafter referred to as a PI frame. The former sync frame in the PI frame is referred to as an even frame, and the latter sync frame in the PI frame is referred to as an odd frame.

Figure 2:
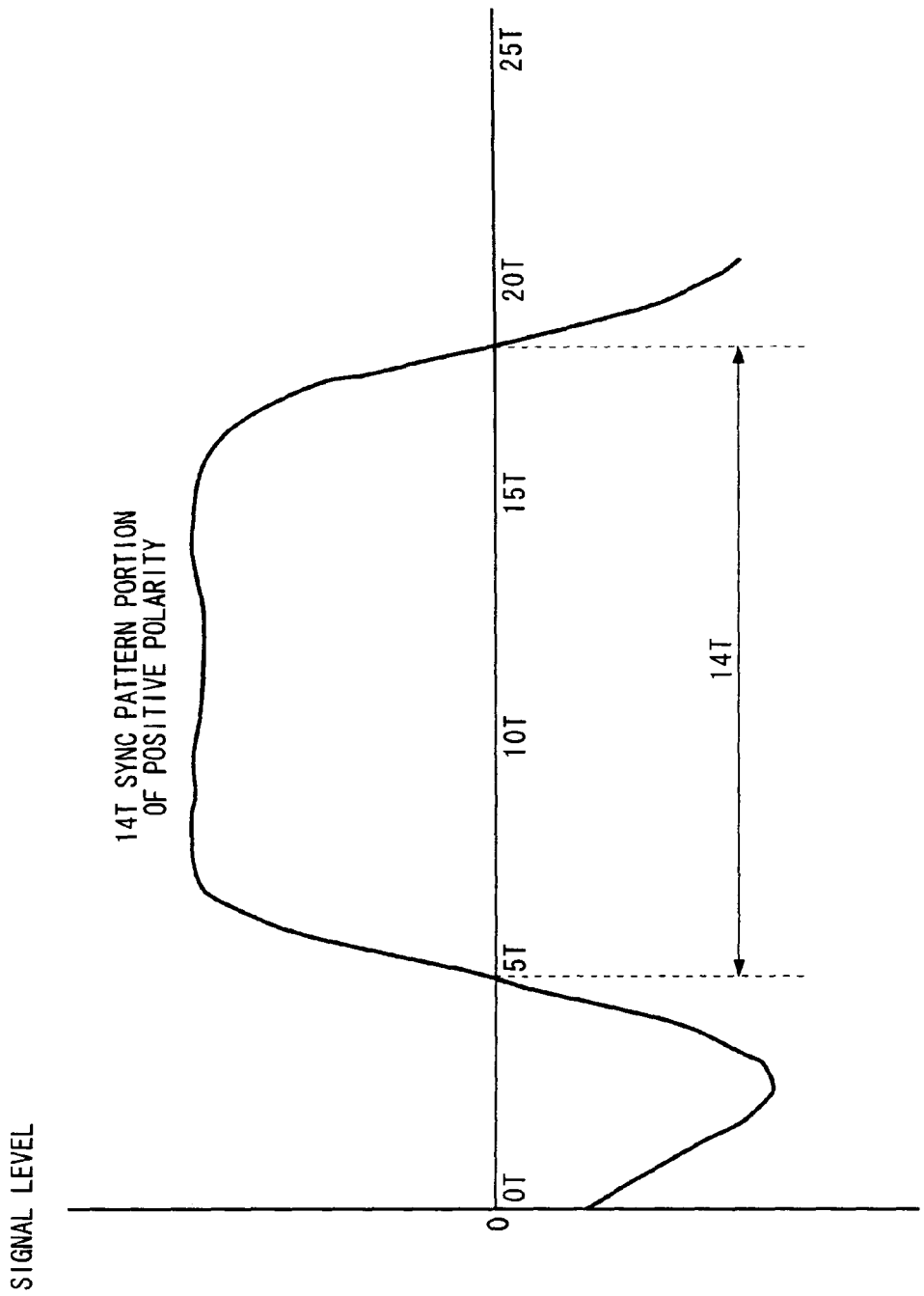
FIG. 2 is a diagram showing a waveform of a 14T sync pattern portion of positive polarity.
Figure 3:
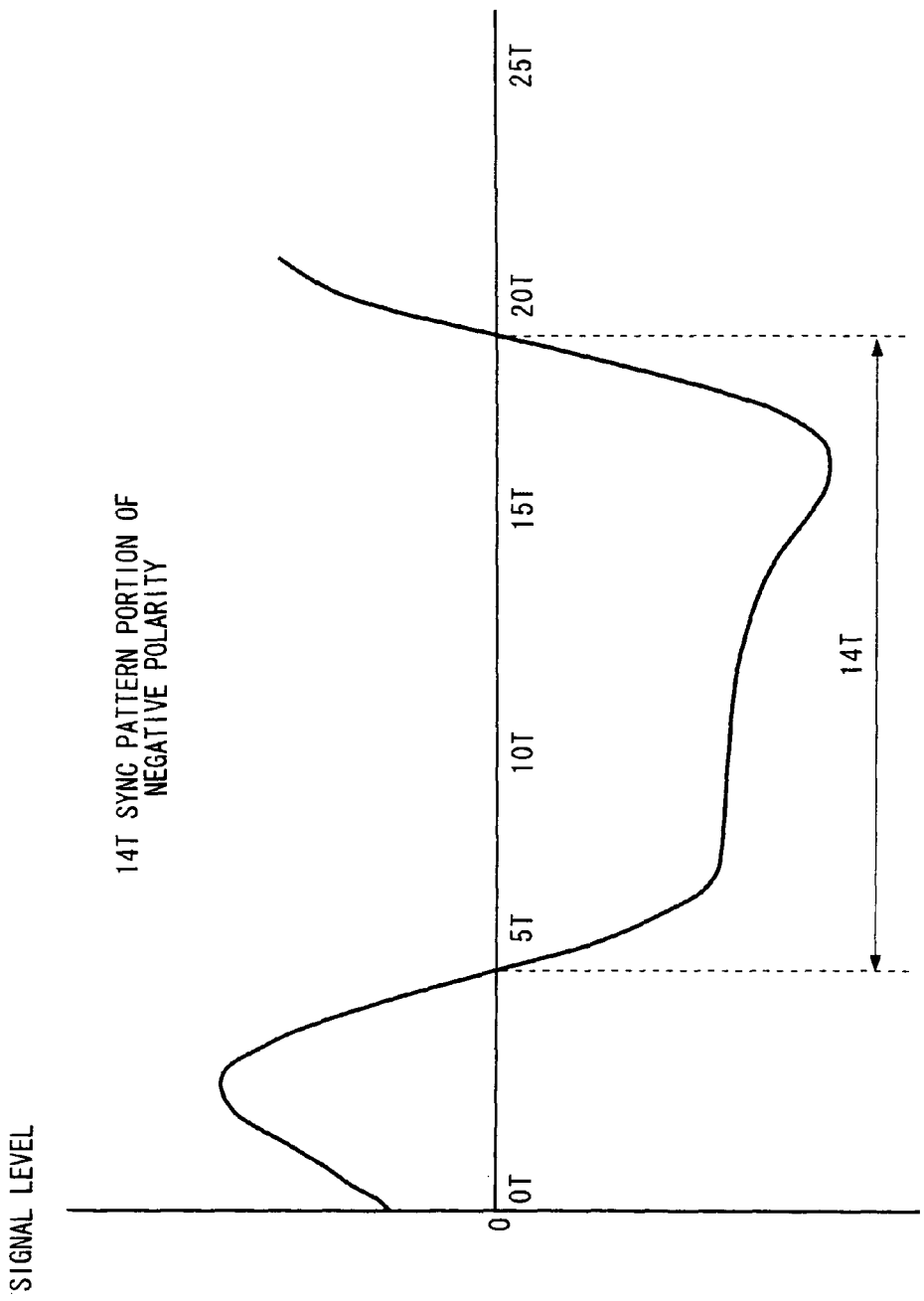
FIG. 3 is a diagram showing a waveform of a 14T sync pattern portion of negative polarity.

FIGS. 2 and 3 show waveforms of the 14T sync pattern portion in an equalized RF signal. FIG. 2 shows a waveform of the sync pattern portion of positive polarity, and FIG. 3 shows a waveform of the sync pattern portion of negative polarity. Note that the polarity of the waveform of the 14T sync pattern portion is determined according to the value of the preceding user data and DSV (digital sum value) control. On the negative side of the signal level shown in FIGS. 2 and 3, information marks exist. A long head portion of the information mark is recorded in a narrow width, so the waveform shown in FIG. 3 is distorted. Thus, the actual read signal is not symmetrical with respect to the zero signal level and is often distorted on the information mark side.

Figure 4:
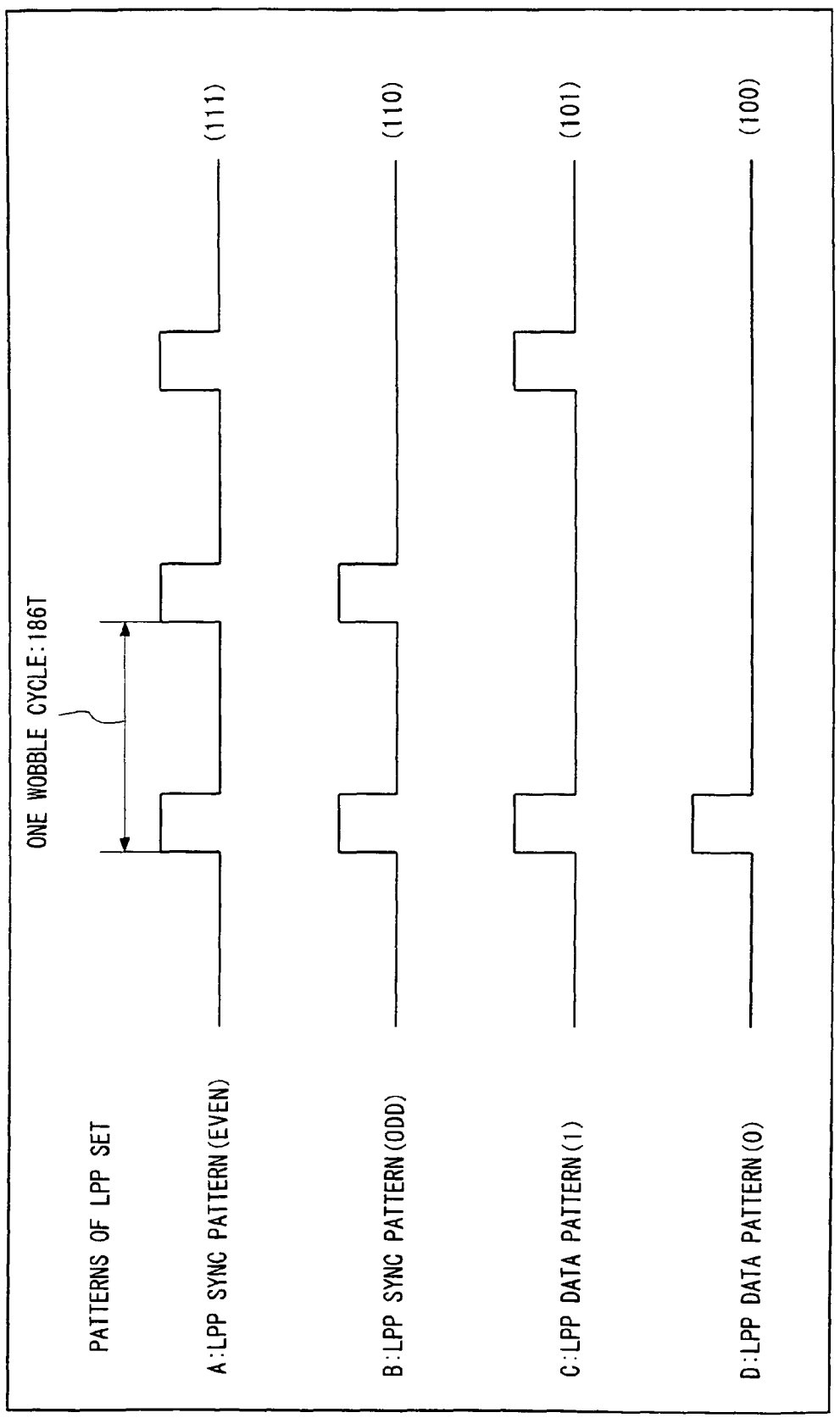
FIG. 4 is a diagram illustrating patterns of an LPP set.

A 3-bit LPP is formed for each PI frame at a position corresponding to one of the even and odd frames of the PI frame. The 3-bit LPP is hereinafter referred to as an LPP set. At the time of recording, information represented by each LPP set is obtained by performing LPP detection on a wobble signal and by obtaining an LPP detection signal corresponding to the LPP set. FIG. 4 shows four patterns of the LPP set and the LPP detection signals corresponding to the respective patterns.

The information represented by each LPP set includes four types of information: "111" and "110" for synchronization of the LPP and "101" and "100" as data of the LPP. A pattern A shown in FIG. 4 is a pattern in which the LPP set for synchronization is formed at the position corresponding to the even frame. The pattern A represents "111". A pattern B shown in FIG. 4 is a pattern in which the LPP set for synchronization is formed at the position corresponding to the odd frame. The pattern B represents "110". A pattern C represents data of "101". A pattern D represents data of "100". Note that each interval between the bits of the 3-bit LPP equals one cycle of the wobble signal (=186T).

As seen from FIG. 4, the first bit of every LPP set pattern is always "1". In the DVD-R/RW optical disk, synchronization information for reproduction information is recorded in a groove area adjacent to an area in which the first bit is formed. Thus, in the RF signal obtained during reproduction, the 14T sync pattern portion of one of the sync frames in each PI frame is distorted due to the effect of the first bit of the LPP set. Meanwhile, the 14T sync pattern portion of the other sync frame is unaffected by the LPP set. The 14T sync pattern portion which is affected by the first bit of the LPP set is hereinafter referred to as an "LPP-present sync pattern portion", and the 14T sync pattern portion which is unaffected by the first bit of the LPP set is referred to as a "non-LPP sync pattern portion".

Figure 5:
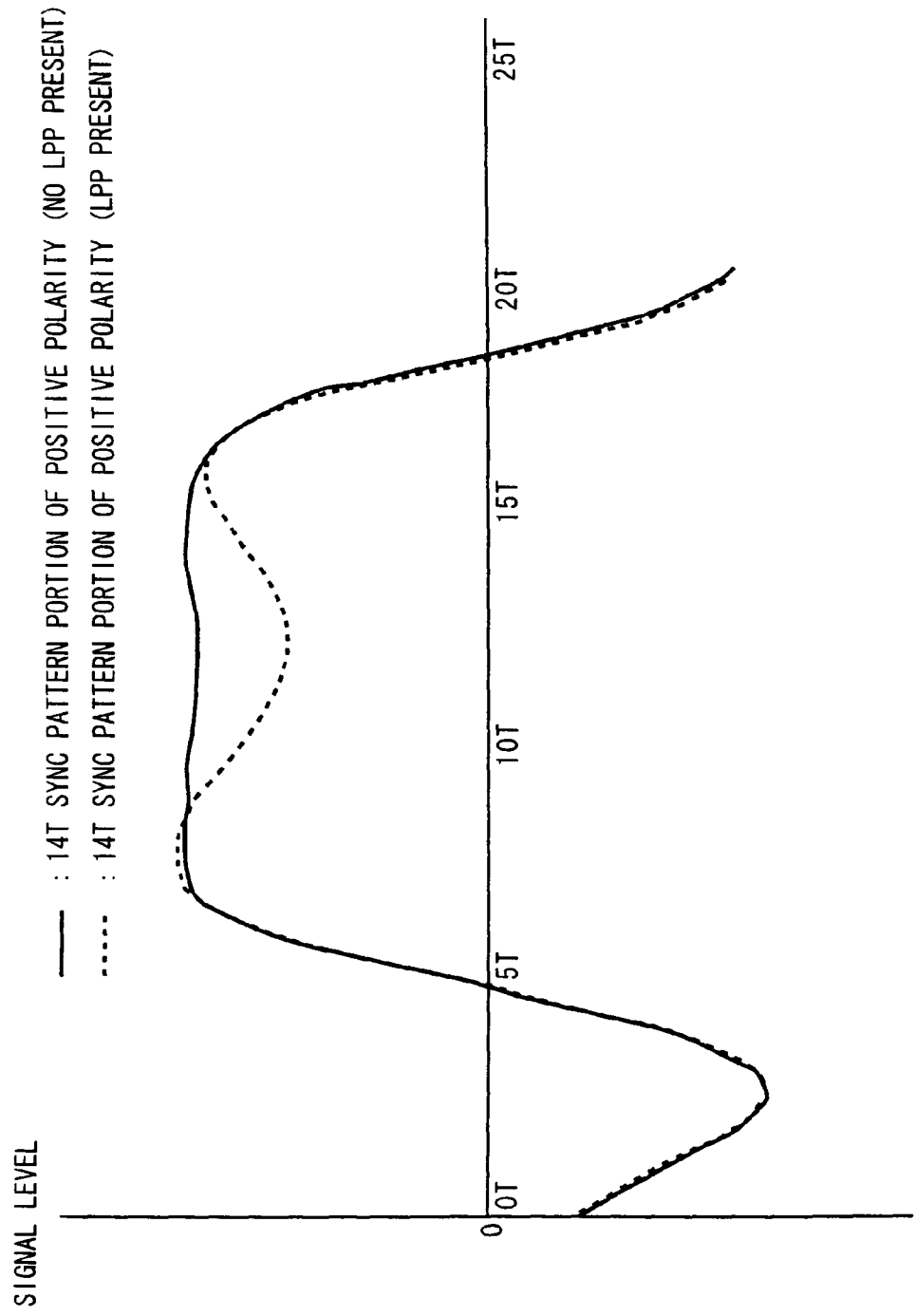
FIG. 5 is a diagram showing an effect of a first bit of the LPP set on the waveform of the 14T sync pattern portion of positive polarity.

FIG. 5 shows the effect of the first bit of the LPP set on the 14T sync pattern portion of positive polarity. The solid line in FIG. 5 indicates the 14T sync pattern portion shown in FIG. 2, i.e., the non-LPP sync pattern portion. The dotted line in FIG. 5 indicates the waveform of the 14T sync pattern portion affected by the LPP, i.e., the LPP-present sync pattern portion. As seen from FIG. 5, the waveform of the 14T sync pattern portion is distorted due to the effect of the LPP, specifically, the first bit of the 3-bit LPP set.

Figure 6:
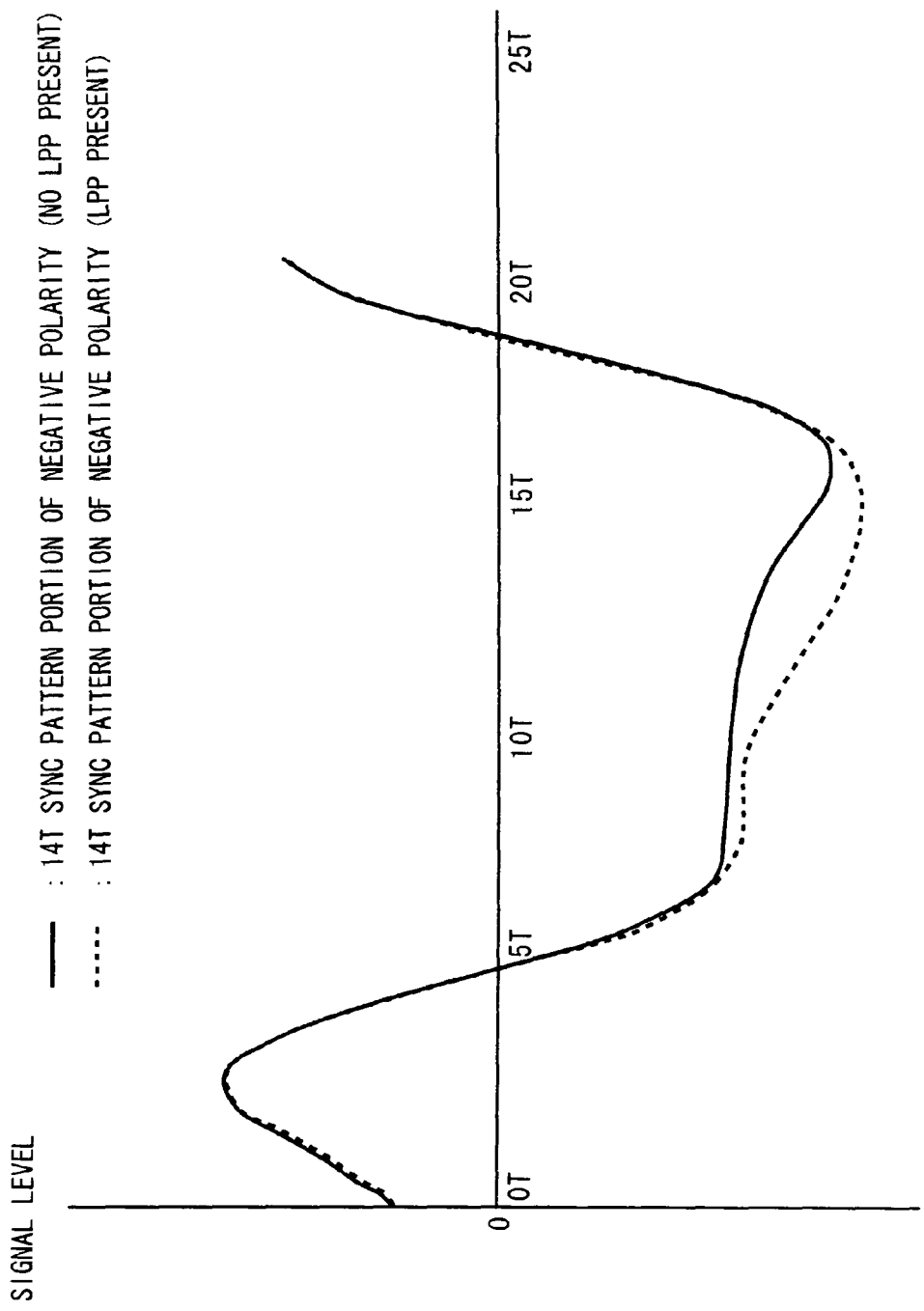
FIG. 6 is a diagram showing an effect of the first bit of the LPP set on the waveform of the 14T sync pattern portion of negative polarity.

FIG. 6 shows the effect of the first bit of the LPP set on the 14T sync pattern portion of negative polarity. The solid line in FIG. 6 indicates the non-LPP sync pattern portion of negative polarity shown in FIG. 3. The dotted line in FIG. 6 indicates the waveform of the 14T sync pattern portion affected by the LPP, i.e., the LPP-present sync pattern portion. As seen from FIG. 6, also in the case of the 14T sync pattern portion of negative polarity, the waveform of the 14T sync pattern portion is distorted due to the effect of the first bit of the LPP set.

In order to eliminate the effect of the LPP in the RF signal, the present inventors have first conceived a method of specifying which portion of the RF signal is affected by the LPP. According to the method, a wobble signal is generated together with an RF signal during reproduction, and an LPP detection signal is obtained by performing LPP detection on the wobble signal. Then, the portion of the RF signal which is affected by the LPP is specified by the LPP detection signal. The wobble signal described herein is similar to a wobble signal to be generated in the case of recording reproduction information on an optical disk.

Figure 7:
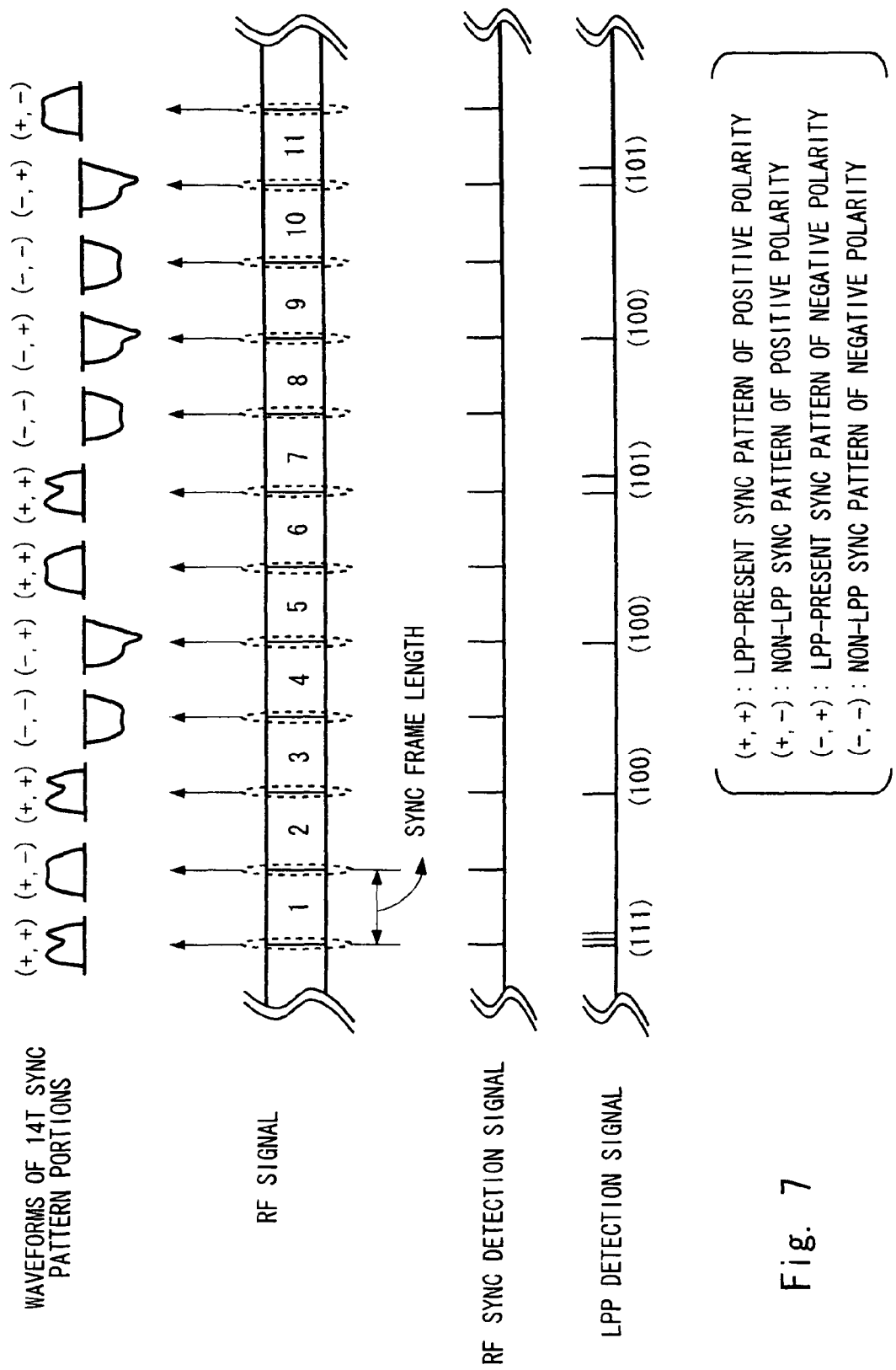
FIG. 7 is a diagram showing the regularity of the effect of the LPP on the 14T sync pattern portions.

FIG. 7 shows examples of the RF signal, an RF sync detection signal obtained by performing detection of the 14T sync pattern portion on the RF signal, the LPP detection signal obtained by performing LPP detection on the wobble signal, and the waveform of each 14T sync pattern.

The RF signal is composed of a plurality of sync frames. FIG. 7 shows sync frames 1 to 11 in chronological order. The sync frames 1, 3, 5, 7, 9, and 11 are even frames, and the sync frames 2, 4, 6, 8, and 10 are odd frames, for example.

As is apparent from the RF sync detection signal, the 14T sync pattern portion is detected at the head of each sync frame.

As is apparent from the LPP detection signal, a single LPP set is detected for every two sync frames, i.e., for each PI frame. In the illustrated example, each LPP set is detected in the even frames of the PI frame.

In the sync frame 1, the LPP set (111) of the pattern A has been detected. In the sync frames 3, 5, and 9, the LPP set (100) of the pattern D has been detected. In the sync frames 7 and 11, the LPP set (101) of the pattern C has been detected. Note that the detection of the LPP set of the pattern A means that all the three bits of the LPP set have been detected. The detection of the LPP set of the pattern B means that the first and second bits of the LPP set have been detected and the third bit thereof has not been detected. Similarly, the detection of the LPP set of the pattern C means that the first and third bits of the LPP set have been detected and the second bit has not been detected, and the detection of the LPP set of the pattern D means that only the first bit of the LPP set has been detected and the second and third bits have not been detected.

The uppermost portion of FIG. 7 shows the waveforms of the 14T sync pattern portions in the sync frames 1 to 11. In every PI frame, the waveform of the 14T sync pattern portion of the sync frame (even frame in this exemplary embodiment) in which the LPP set has been detected is distorted. Meanwhile, the waveform of the 14T sync pattern portion of the sync frame (odd frame in this exemplary embodiment) in which the LPP set has not been detected is not distorted.

As described above, the distortion in the waveform of the 14T sync pattern portion is due to the effect of the first bit of the LPP set. Here, consideration is given to the effect of the second and third bits of the LPP set of the pattern A on the RF signal.

Figure 8:
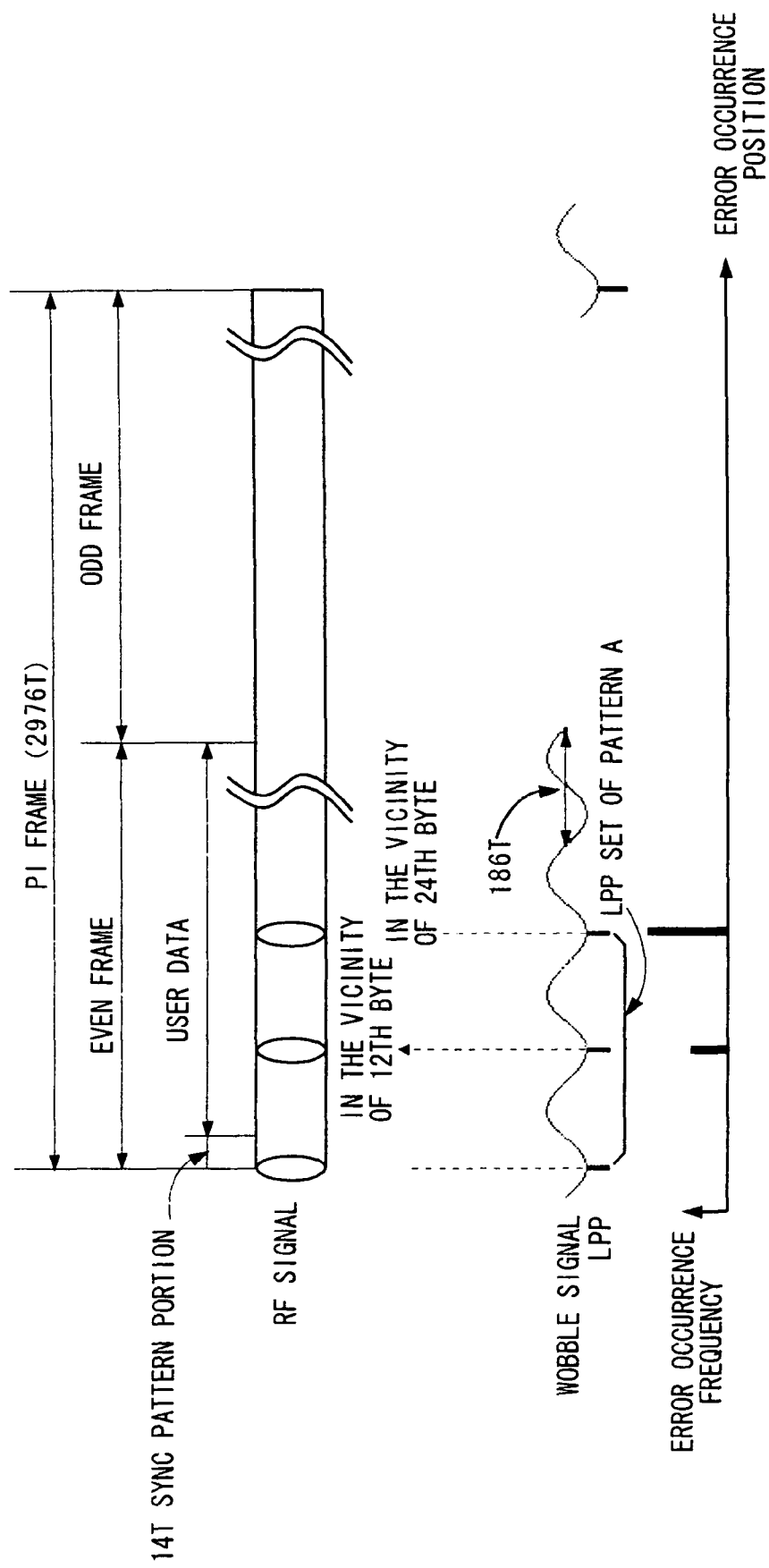
FIG. 8 is a diagram illustrating an effect of the LPP set on user data of an RF signal.

FIG. 8 shows the timing at which each bit of the LPP set (111) of the pattern A is detected. Since the LPP set of this example corresponds to the pattern A, the first bit of the LPP set is detected in the vicinity of the center of the 14T sync pattern portion of the even frame. According to the DVD-R/RW standards, modulation is performed so that 16T corresponds to 1 byte. Accordingly, the second and third bits of the LPP set are located in the vicinity of the 12th byte and in the vicinity of 24th byte of the even frame, respectively, and each of the bits is positioned in a user data area. In other words, the second and third bits of the LPP set of the pattern A have an influence on the user data portion of the RF signal.

The 14T sync pattern which is automatically inserted during recording of user information is deleted before ECC (Error Correction Code) decoding. Further, as described above, the LPP set is formed at the position corresponding to one of the sync frames in each PI frame. Accordingly, in the example shown in FIG. 8, both the 14T sync pattern portion and the user data portion in the odd frame of the PI frame are unaffected by the LPP.

Similarly, the second bit of the LPP set (110) of the pattern B and the third bit of the LPP set (101) of the pattern C have an influence on the user data portion of the RF signal.

If the user data portion of the RF signal is distorted due to the effect of the LPP, a number of errors occur during binarization by a Viterbi decoder or the like, resulting in deterioration of reproduction quality. As shown in the lower portion of FIG. 8, a number of errors occur at positions (in the vicinity of 12th byte and in the vicinity of 24th byte) corresponding to the timings when the second and third bits of the LPP set of the pattern A are detected in the RF signal. The error occurrence frequency in the vicinity of 12th byte is lower, because the probability that the second bit of the LPP set is "1" is low.

On the basis of the above-mentioned findings, the present inventors have developed a method of reducing errors by eliminating the effect of the LPP from the RF signal during reproduction. The method includes the following steps.

<Step 1>

In the case of reproducing reproduction information recorded on a DVD-R/RW optical disk, a wobble signal is generated together with an RF signal. The generation of the RF signal is similar to processing at the time of reproduction to be performed by an optical disk device according to a related art, and the generation of the wobble signal is similar to processing at the time of recording to be performed by the optical disk device according to the related art.

<Step 2>

LPP detection is performed on the wobble signal. The LPP detection is similar to processing at the time of recording to be performed by the optical disk device according to the related art.

<Step 3>

A difference set is obtained by performing processing of calculating a difference in signal level between a non-LPP sync pattern portion and a LPP-present sync pattern portion having the same polarity.

As described above, the non-LPP sync pattern portion is the 14T sync pattern portion which is unaffected by the first bit of the LPP set, specifically, the 14T sync pattern portion obtained when the LPP is not detected at the timing of the 14T sync pattern portion.

The LPP-present sync pattern portion is the 14T sync pattern portion which is affected by the first bit of the LPP set, specifically, the 14T sync pattern portion obtained when the LPP is detected at the timing of the 14T sync pattern portion.

Figure 9:
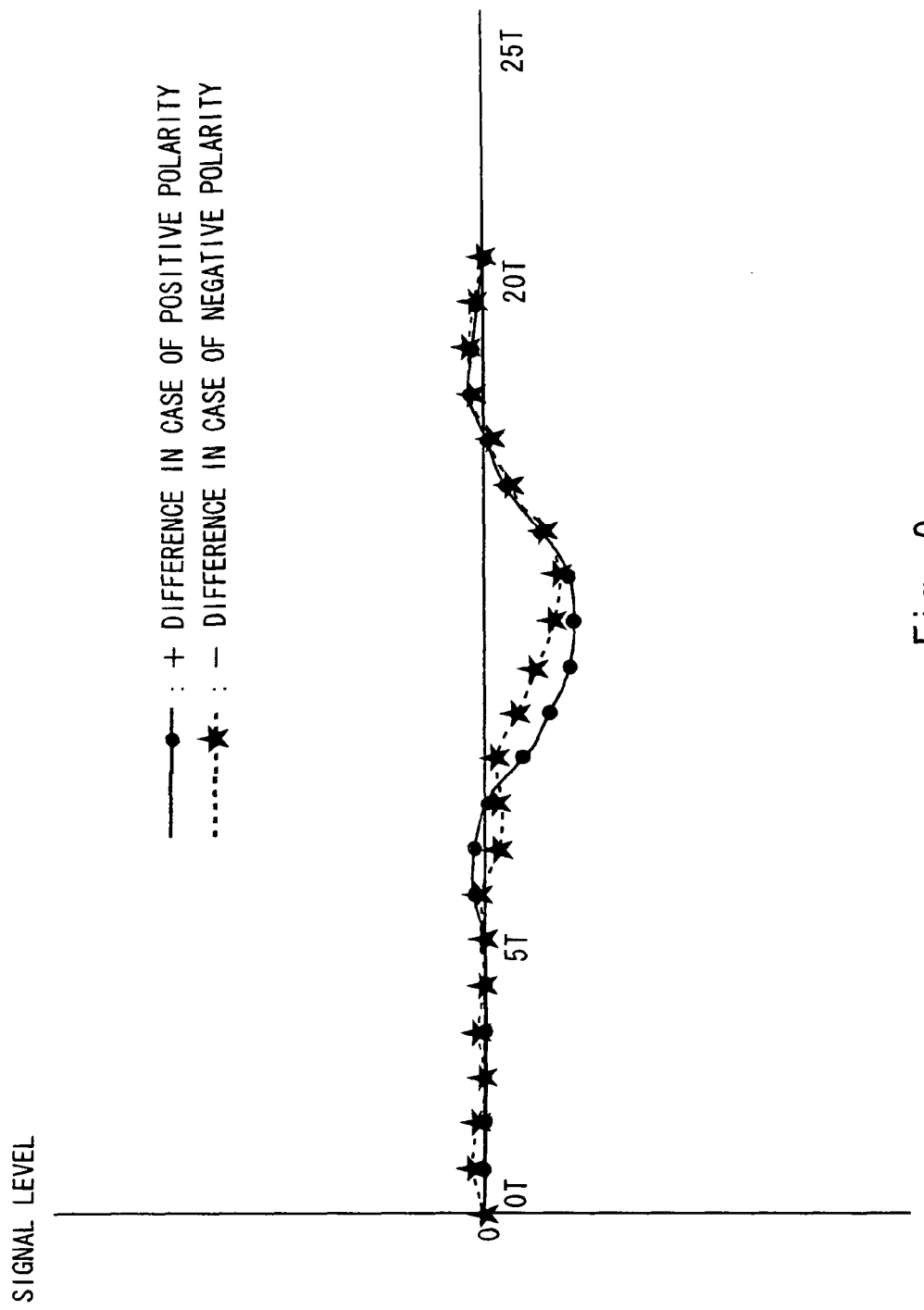
FIG. 9 is a diagram showing differences in signal level of the 14T sync pattern portions between the case where the effect of the LPP is present and the case where the effect of the LPP is not present.

As long as the non-LPP sync pattern portion and the LPP-present sync pattern portion, which are used in calculation of the difference set, have the same polarity, the polarity is not limited to one of the positive polarity and the negative polarity. FIG. 9 shows examples of the difference set calculated between the non-LPP sync pattern portion and the LPP-present sync pattern portion, each of which has the positive polarity, and the difference set calculated between the non-LPP sync pattern portion and the LPP-present sync pattern portion, each of which has the negative polarity.

<Step 4>

The RF signal obtained at the timing when the LPP is detected is corrected using the calculation result obtained in Step 3. Specifically, the corresponding difference included in the difference set is subtracted from each level of the corresponding portion of the RF signal.

Alternatively, the difference set calculated between the non-LPP sync pattern portion and the LPP-present sync pattern portion, each of which has the positive polarity, and the difference set calculated between the non-LPP sync pattern portion and the LPP-present sync pattern portion, each of which has the negative polarity, may be averaged, and an averaged difference set may be used for the correction.

Figure 10:
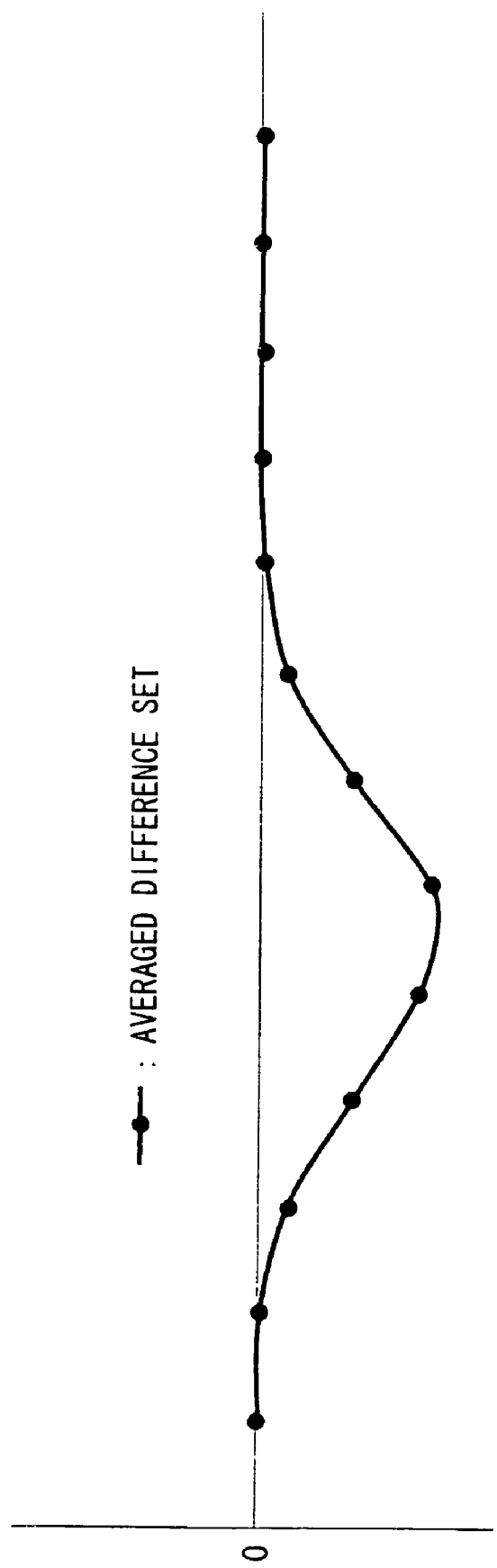
FIG. 10 is a diagram showing an example of an averaged difference.

Further, a difference set obtained by performing averaging processing between the 14T sync pattern portion and each difference set calculated with the progress of the LPP detection (i.e., averaging processing between difference sets in a time direction) is desirably used for the subsequent correction of the RF signal. FIG. 10 shows an example of the difference set subjected to the averaging processing.

The difference set may also be calculated after processing of averaging signal levels of the LPP-present sync pattern portions and signal levels of the non-LPP sync pattern portions in the time direction.

The averaging processing in the time direction is desirably performed by using, for example, an IIR filter.

On the basis of the above-mentioned principle, the exemplary embodiments of the present invention will be described below.

First Exemplary Embodiment

Figure 11:
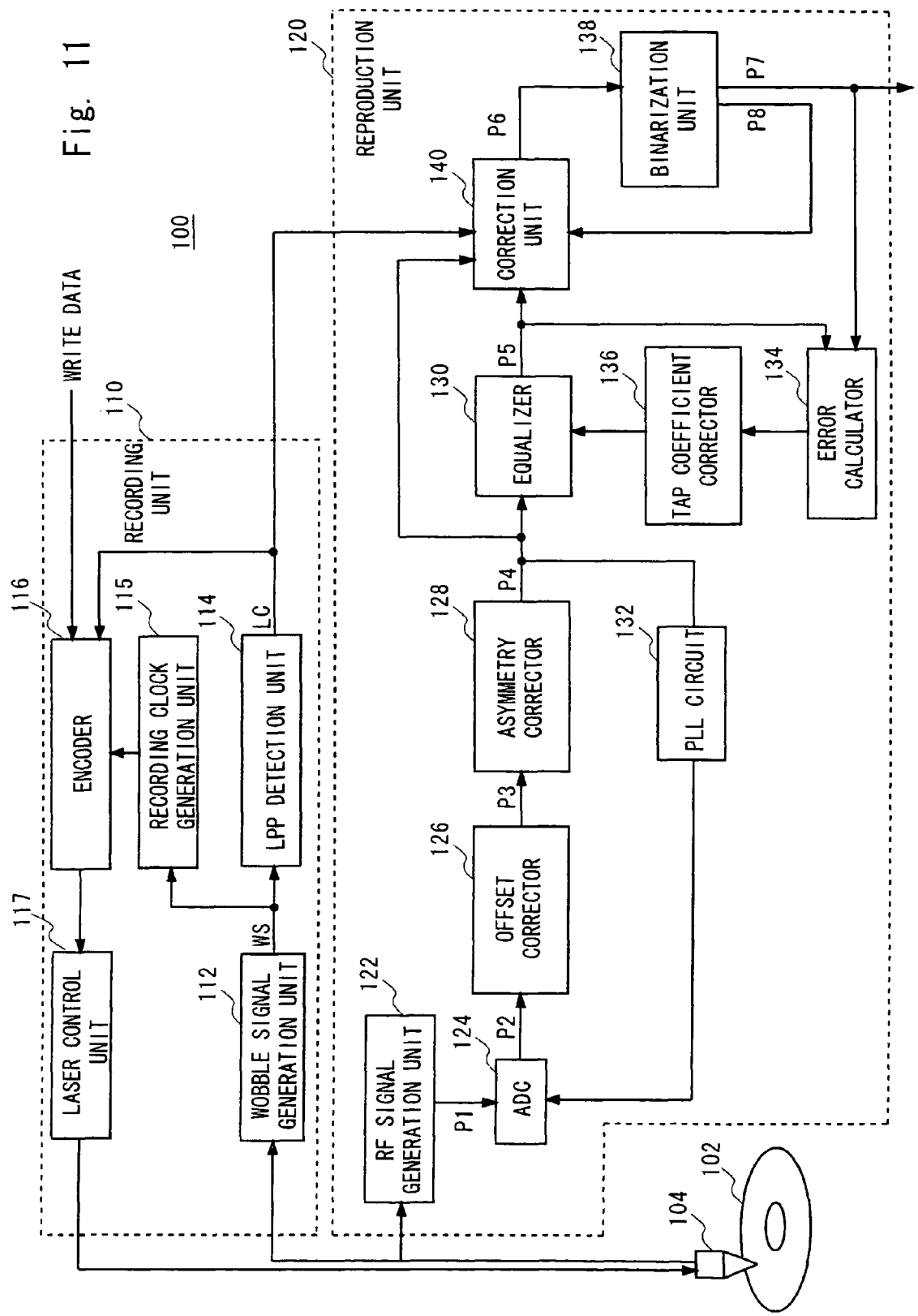
FIG. 11 is a diagram showing an optical disk device according to a first exemplary embodiment of the present invention.

FIG. 11 shows an optical disk device 100 according to a first exemplary embodiment of the present invention. The optical disk device 100 is compliant with DVD-R/RW standards, and records and reproduces reproduction information on and from a DVD-R/RW optical disk. The optical disk device 100 includes an optical head 104, a recording unit 110, and a reproduction unit 120.

The recording unit 110 records synchronization information and reproduction information on an optical disk 102. The recording unit 110 includes a wobble signal generation unit 112, an LPP detection unit 114, a recording clock generation circuit 115, an encoder 116, and a laser control unit 117. The wobble signal generation unit 112 generates a wobble signal WS by performing filtering processing for removing noise from a differential signal of reflected laser light which is irradiated onto the optical disk 102 by the optical head 104. The LPP detection unit 114 performs LPP detection on the wobble signal WS to thereby obtain an LPP detection signal LC. The recording clock generation circuit 115 generates a recording clock from the wobble signal WS and encodes write data received from a host computer (not shown) or the like by a predetermined method. The laser control unit 117 performs a laser power control, which is called "write strategy", on the data output from the encoder 116. The data is then recorded on the optical disk 102 through the optical head 104. The recording unit 110 records the reproduction information and the synchronization information as information marks by using physical address information, other information necessary for recording, and the position of the LPP, which are represented by the LPP detection signal LC obtained by the LPP detection unit 114, as a reference.

In the first exemplary embodiment, the wobble signal generation unit 112 and the LPP detection unit 114 of the recording unit 110 operate also during reproduction. Except for this point, other constituent elements (not shown) of the wobble signal generation unit 112, the LPP detection unit 114, the recording clock generation circuit 115, the encoder 116, the laser control unit 117, and the recording unit 110 are similar to those of the optical disk device according to the related art, so the detailed description thereof is omitted.

The reproduction unit 120 performs reproduction processing on the optical disk 102. The reproduction unit 120 includes an RF signal generation unit 122, an ADC 124, an offset corrector 126, an asymmetry corrector 128, an equalizer 130, a PLL circuit 132, an error calculator 134, a tap coefficient corrector 136, a correction unit 140, and a binarization unit 138.

The RF signal generation unit 122 obtains an analog RF signal P1, which contains the reproduction information and the synchronization information, from the reflected laser light which is irradiated onto the groove of the optical disk 102 by the optical head 104.

As described above, in the first exemplary embodiment, the wobble signal generation unit 112 and the LPP detection unit 114 operate also during reproduction. During reproduction, the wobble signal generation unit 112 generates the wobble signal WS simultaneously with the generation of the RF signal by the RF signal generation unit 122. The LPP detection unit 114 performs LPP detection on the wobble signal WS, thereby obtaining the LPP detection signal LC. During reproduction, the LPP detection signal LC is output to the correction unit 140.

The ADC 124 performs AD conversion on the analog RF signal P1 to thereby obtain a digital RF signal P2.

The offset corrector 126 performs offset correction for absorbing DC fluctuation, for example, on the digital RF signal P2.

The asymmetry corrector 128 receives an output P3 of the offset corrector 126, detects asymmetry, and corrects the asymmetry.

The PLL circuit 132 controls an output P4 of the asymmetry corrector 128 and a sampling clock of the ADC 124 to be synchronized in phase with the analog RF signal P1.

The equalizer 130 equalizes the output P4 of the asymmetry corrector 128 by using a tap coefficient controlled by the tap coefficient corrector 136 so as to obtain a PR characteristic determined by the binarization unit 138, e.g., a Viterbi decoder, thereby obtaining an equalized digital RF signal P5.

The correction unit 140 corrects the equalized digital RF signal P5 and outputs a corrected digital RF signal P6 to the binarization unit 138. The correction unit 140 will be described in detail later.

The binarization unit 138 is composed of, for example, a Viterbi decoder. The binarization unit 138 performs maximum likelihood detection on the corrected RF signal P6 to be decoded, and obtains and outputs binary data P7 which is a channel bit data string. In the first exemplary embodiment, the binarization unit 138 also outputs a signal P8, which represents the timing of the 14T sync pattern portion for each synch frame of the RF signal, to the correction unit 140. The signal P8 is hereinafter referred to as a "sync detection signal".

The error calculator 134 receives the RF signal P5 equalized by the equalizer 130 and the binary data P7 obtained by the binarization unit 138, and outputs error information. The tap coefficient corrector 136 corrects the tap coefficient so that the difference between the equalized digital RF signal P5 and the output of the error calculator 134 is minimized, and outputs the corrected tap coefficient to the equalizer 130.

Figure 12:
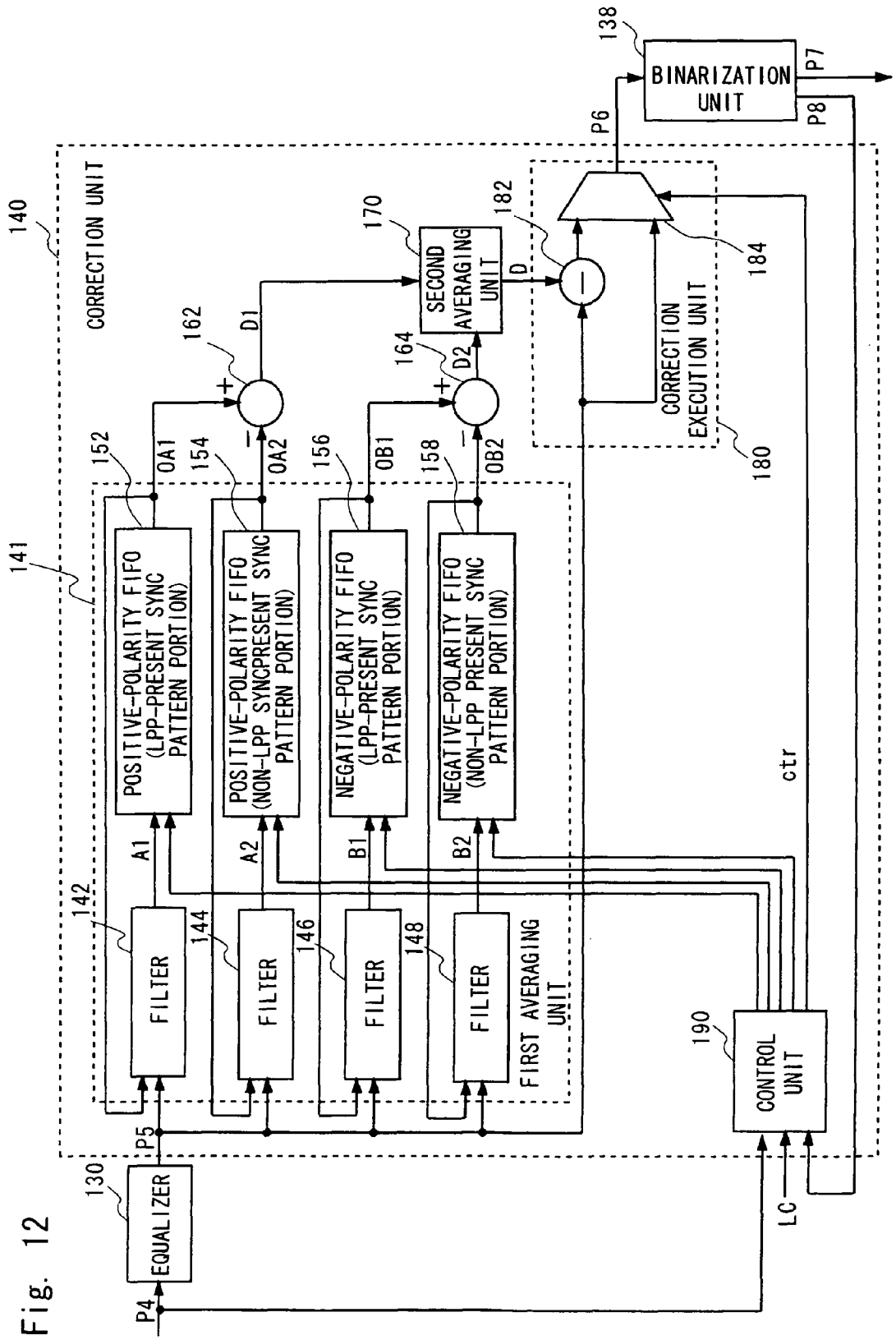
FIG. 12 is a diagram showing a correction unit of the optical disk device shown in FIG. 11.

FIG. 12 shows the correction unit 140 in detail. The correction unit 140 corrects the RF signal, specifically, the equalized digital RF signal P5 in this case, to eliminate the effect of the LPP. The correction unit 140 includes a first averaging unit 141, two subtractors (162 and 164), a second averaging unit 170, a correction execution unit 180, and a control unit 190. The first averaging unit 141 includes four filters (142, 144, 146, and 148) and four FIFOs (152, 154, 156, and 158). The subtractors 162 and 164 and the second averaging unit 170 constitute a difference calculation unit. The correction execution unit 180 includes a subtractor 182 and a selector 184.

The control unit 190 controls the operation timing of the other constituent elements and the object to be processed, based on the output P4 of the asymmetry corrector 128, the sync detection signal P8 output from the binarization unit 138, and the LPP detection signal IC output from the LPP detection unit 114. Specifically, the control unit 190 determines the timing of the 14T sync pattern portion in the equalized digital RF signal P5 based on the sync detection signal P8, and detects the polarity of the 14T sync pattern portion by referring to the output P4 of the asymmetry corrector 128. Further, the control unit 190 checks whether the first bit of the LPP is detected at the timing of the 14T sync pattern portion, based on the LPP detection signal LC. Every time the timing of the 14T sync pattern portion is notified from the binarization unit 138, the control unit 190 controls the filters 142, 144, 146, and 148 and the FIFOs 152, 154, 156, and 158 according to the polarity of the 14T sync pattern portion and according to the presence or absence of the detection of the first bit of the LPP.

Furthermore, the control unit 190 outputs a control signal ctr, which indicates whether or not to execute correction, to the correction execution unit 180, thereby controlling the correction execution unit 180. Specifically, the control unit 190 controls the correction execution unit 180 so as to correct only a portion of the equalized digital RF signal P5 corresponding to the timing when the LPP is detected and so as not to correct the other portions.

The operation of the correction unit 140 shown in FIG. 12 will be described in detail. The first exemplary embodiment relates to an optical disk device compliant with the DVD-R/RW standards. In such an optical disk, information is read by irradiating laser light onto the optical disk 102 shown in FIG. 11. In this case, the reading of information by irradiation of laser light is started from a position before the position at which the information to be read is written. When the address at which the information to be read is first written is "30000", for example, the reading of information by irradiation of laser light is started from an address "29000".

The correction unit 140 shown in FIG. 12 includes the four FIFOs 152, 154, 156, and 158. The FIFOs store the RF signals shown in FIGS. 5 and 6 according to their polarities. For example, the FIFOs store RF signals 0T to 20T shown in FIGS. 5 and 6. Specifically, the RF signals are sampled every 1T, and the value of the signal corresponding to each of the sampling points of T0 to 20T is stored in an FIFO corresponding to the polarity of the sampled RF signal.

At the time when the reading of the information written in the optical disk is started, the four FIFOs have no information stored therein. However, when the reading position reaches the position at which the information is to be read, the four FIFOs 152, 154, 156, and 158 have signal values stored therein. This is because the reading of information is started from an address before the address at which the information to be read is first written.

Therefore, in the first exemplary embodiment, necessary correction can be performed on the RF signals from the time when the information to be read is first read.

The operation of the correction unit 140 shown in FIG. 12 will be described below, assuming that the FIFOs 152, 154, 156, and 158 store an amount of data corresponding to 20T in which the RF signals are sampled. First, the equalizer 130 receives the signal P4 from the asymmetry corrector 128, and the control unit 190 also receives the signal P4. The control unit 190 determines whether the polarity of the RF signal to be subsequently received is positive or negative based on the received signal P4. Further, the control unit 190 receives the signal LC output from the LPP detection unit 114 shown in FIG. 11, and determines whether the RF signal to be subsequently supplied to the correction unit 140 is affected by the LPP, i.e., whether it is necessary for the correction unit 140 to correct the RF signal. Then, when it is necessary to correct the RF signal to be subsequently supplied to the correction unit 140, the control unit 190 outputs the control signal ctr to cause the selector 184 to select a signal line connected to the subtractor 182. On the other hand, when it is not necessary to correct the RF signal to be subsequently supplied to the correction unit 140, the control unit 190 outputs the control signal ctr to cause the selector 184 to select a signal line to which the subtractor 182 is not connected.

Meanwhile, the equalizer 130 outputs the signal P5, which is a digital RF signal, to the correction unit 140. For convenience of explanation, it is assumed that the signal P5 is an RF signal that needs to be corrected by the correction unit 140.

The signal P5 is supplied to each of the filters 142, 144, 146, and 148 and to the selector 184. As described above, the signal P5 is corrected by the subtractor 192 according to the control signal ctr output from the control unit 190, and is then output from the selector 184. In this case, the control unit 190 controls the four FIFOs so as to read an amount of sampling data corresponding to 20T from each of the four FIFOs 152, 154, 156, and 158, based on the LC signal indicating that the RF signal needs to be corrected. Note that the four FIFOs serially output the sampling data per 1T. The subtractor 162 subtracts between the sampling data of the RF signal output from the positive-polarity FIFO 152 and the sampling data of the RF signal output from the positive-polarity FIFO 154. The subtraction is also performed serially. The subtractor 164 subtracts between the sampling data of the RF signal output from the negative-polarity FIFO 156 and the sampling data of the RF signal output from the negative-polarity FIFO 158. The subtraction is also performed serially.

The subtractors 162 and 164 sequentially and serially output the data after subtraction. The output data is supplied to the second averaging unit 170. The second averaging unit 170 averages received data D1 and D2 and outputs the averaged data to the subtractor 182. Then, the subtractor 182 subtracts the value output from the second averaging unit 170 from the signal P5 output from the equalizer 130. The RF signal is corrected in the manner as described above.

Further, the digital RE signal output from the selector 184 is processed as the signal P6 by the binarization unit 138. The binarization unit 138 outputs the sync detection signal P8 to the control unit 190 based on the processing result. The sync detection signal P8 is a reference signal for determining a timing for the control unit 190 to control each of the FIFOs 152, 154, 156, and 158.

The control unit 190 estimates the timing at which the sync pattern portion is supplied to the first averaging unit 141 by using the previous sync detection signal as a reference during the processing for the information located at a position before the position at which the information to be read is first written. That is, the control unit 190 also functions as a sync pattern estimation unit. The estimation is made based on the characteristic inherent in the standards, i.e., the characteristic that sync pattern portions are provided at regular intervals. In the case where the subsequent reading is to be performed from the position at which the information to be read is first written, the control unit 190 controls the four FIFOs by using the estimated timing information.

In the manner as described above, the four FIFOs can be controlled at an estimated given timing with the previous sync detection signal as a reference. As a result, an arbitrary circuit configuration can be obtained depending on the delay amount of each of the first averaging unit 141 and the second binarization unit 138, and thus the amount of circuits can be reduced.

According to another exemplary embodiment of the present invention, the control unit 190 can also be implemented by a configuration for controlling the four FIFOs with a sync pattern detection signal from the binarization unit 138 as a reference, without using the signal estimated with the previous sync detection signal as a reference. In this case, a circuit delay due to binarization and sync detection occurs in the binarization unit 138. For this reason, a delay buffer (not shown) is provided on the input side of the filters 142, 144, 146, and 148. The delay buffer allows the control unit 190 to control the FIFOs 152, 154, 156, and 158 to store a desired sync pattern, based on the information represented by the sync detection signal P8 from the binarization unit 138.

The sync detection signal P8 serving as the reference signal for the control unit 190 may fail to carry out detection due to the presence of a damage or a defect on the surface of the optical disk. In order to avoid this, it is possible to use a signal generated at a sync position which is estimated from the previous sync detection based on the characteristic inherent in the standards, i.e., the characteristic that the sync frames are provided at regular intervals, specifically, the sync patterns are provided at regular intervals.

As described above, the control signal 190 performs control such that a signal passing through a corresponding filter is stored in one FIFO corresponding to the polarity of the RF signal P5 supplied to the correction unit 140, based on the sync detection signal P8. The data stored in one FIFO corresponding to the polarity of the signal P5 is overwritten. Thus, preparations for correction of the RF signal to be subsequently corrected are completed.

Assuming that an output Al of the filter 142 is supplied to the FIFO 152, the output of the FIFO 152 is represented by OA1, and a filter coefficient set in the filter is represented by K ($0<K<1$), the relationship between A1 and OA1 is expressed by the following expression (1).

$$A1 = OA1 \times (1-K) + P5 \times K \qquad (1)$$

Assuming that the FIFO 152 has a memory length of 20T, for example, and the FIFO 152 is operated by an amount corresponding to 20T per 1T only when the signal P5 corresponds to the LPP sync pattern portion and has a positive polarity, the data stored in the memory is updated and a first IIR filter operation is executed. Accordingly, the averaged data set is stored in the FIFO 152 every time the LPP sync pattern of positive polarity is received. A time constant for the averaging processing is determined by the filter coefficient K. The time constant increases as the filter coefficient K decreases.

The output OA1 of the FIFO 152 is hereinafter also referred to as a "positive-polarity LPP-present average signal".

Similarly, every time the positive LPP non-sync pattern is received, the filter 144 and the FIFO 154 update the memory contents of the FIFO 154 and execute the averaging processing, and the FIFO 154 outputs a "positive-polarity non-LPP average signal OA2".

Furthermore, every time the negative LPP synchronization-present pattern is received, the filter 146 and the FIFO 156 update the memory contents of the FIFO 156 and execute averaging processing, and the FIFO 156 outputs a "negative-polarity LPP-present average signal OB1".

Moreover, every time the negative LPP non-sync pattern is received, the filter 148 and the FIFO 158 update the memory contents of the FIFO 158 and execute averaging processing, and the FIFO 158 outputs a "negative-polarity non-LPP average signal OB2".

The subtractor 162 calculates the difference D1 between the positive-polarity LPP-present average signal OA1 output from the positive-polarity FIFO 152 and the positive-polarity non-LPP average signal 0A2 output from the positive-polarity FIFO 154, and outputs the difference D1 to the second averaging unit 170. Hereinafter, let the difference D1 be a positive-polarity difference.

The subtractor 164 calculates the difference D2 between the negative LPP-present average signal OB1 output from the negative-polarity FIFO 156 and the negative-polarity non-LPP average signal OB2 output from the negative-polarity FIFO 158, and outputs the difference D2 to the second averaging unit 170. Hereinafter, let the difference D2 be a negative-polarity difference.

The second averaging unit 170 calculates an average difference D by averaging the positive-polarity difference D1 output from the subtractor 162 and the negative-polarity difference D2 output from the subtractor 164, and outputs the average difference D to the subtractor 182 of the correction execution unit 180.

The subtractor 182 of the correction execution unit 180 performs subtraction processing for subtracting the average difference D from the signal level on the equalized digital RF signal P5, and outputs the subtraction result to the selector 184.

The selector 184 outputs the equalized digital RF signal P5 or outputs the signal received from the subtractor 182 in accordance with the control signal ctr. Specifically, when the control signal ctr indicates that "no correction is to be made", which corresponds to the fact that the LPP has not been detected, the selector 184 outputs the equalized digital RF signal P5. Meanwhile, when the control signal ctr indicates that "correction is to be made", which corresponds to the fact that the LPP has been detected, the selector 184 outputs the signal received from the subtractor 182.

In short, the correction execution unit 180 performs correction processing for eliminating the effect of the LPP on the RF signal at the timing at which the LPP is detected by the LPP detection unit 114.

Figure 13:
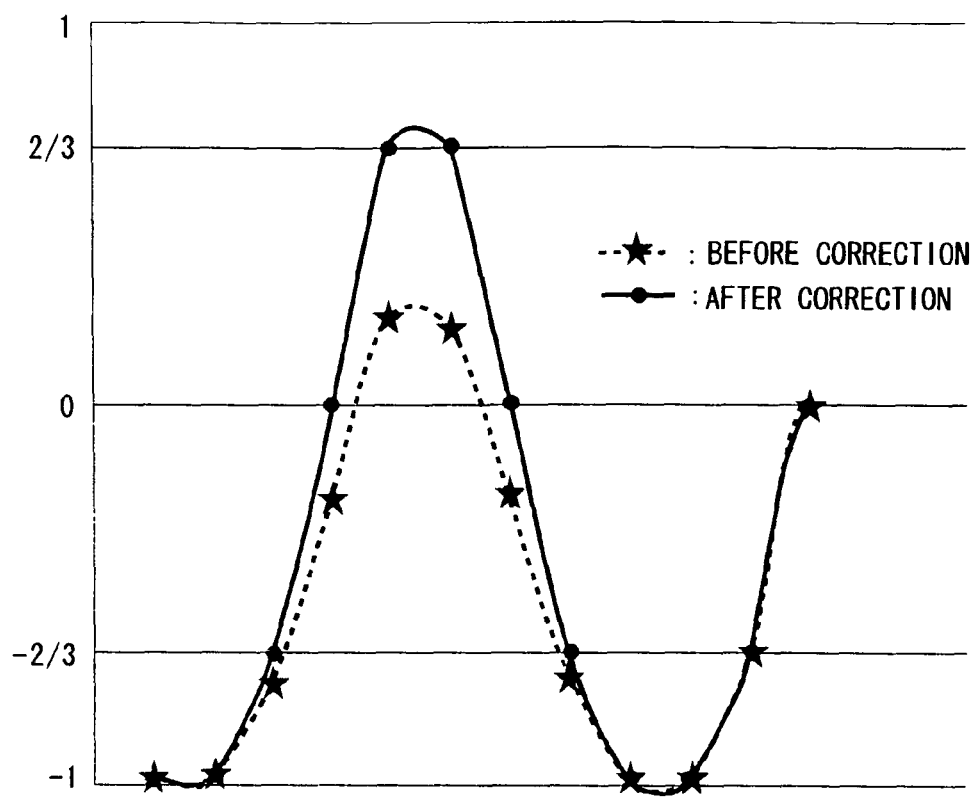
FIG. 13 is a diagram showing an example of results of correction shown in FIG. 12.

FIG. 13 shows an example of the results of the correction processing performed on a user data area portion of the RF signal, which is affected by the LPP, during reproduction by the optical disk device 100 according to the first exemplary embodiment. The dotted line of FIG. 13 indicates a part of a waveform which includes user information and has an amplitude that decreases due to the effect of the second or third bit of the LPP. The inputs to the Viterbi decoder, which are originally present in the vicinity of five equalized levels of 0, ±2/3, and ±1 by PR (1, 2, 2, 1) equalization, are significantly deviated from the levels. The correction allows restoration to the original equalization levels.

Figure 14:
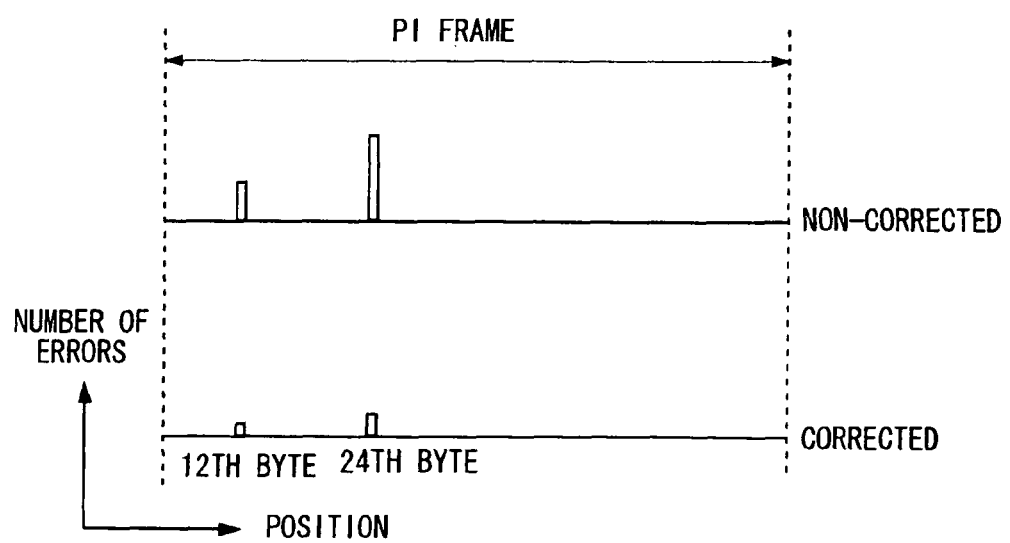
FIG. 14 is a diagram for comparison between the number of errors occurring during reproduction of the optical disk device shown in FIG. 11 and the number of errors occurring during reproduction of an optical disk device according to a related art.

FIG. 14 is a diagram for comparison between the number of errors occurring at the time of binarization during reproduction by the optical disk device 100 according to the first exemplary embodiment and the number of errors occurring at the time of binarization during reproduction by the optical disk device according to the related art in which the effect of the LPP is not corrected. As shown in FIG. 14, the number of errors occurring at the time of binarization is reduced by the optical disk device 100 according to the first exemplary embodiment.

Second Exemplary Embodiment

A second exemplary embodiment of the present invention also relates to an optical disk device compliant with the DVD-R/RW standards. The optical disk device of the second exemplary embodiment is equivalent to the optical disk device 100 of the first exemplary embodiment shown in FIG. 11 except that the correction unit 140 is replaced by a correction unit 200 shown in FIG. 15. In the second exemplary embodiment, only the correction unit 200 will be described. Components in FIG. 15 that are identical to those of the correction unit 140 shown in FIG. 12 are denoted by the same reference numerals, and the detailed description thereof is omitted.

The correction unit 200 performs correction processing for eliminating the effect of the LPP on the RF signal, specifically, the equalized digital RF signal P5 in this exemplary embodiment. The correction unit 200 includes two FIFOs (212 and 214), a subtractor 230, a first averaging unit 231, the correction execution unit 180, and a control unit 290. The first averaging unit 231 includes a filter 232 and a difference FIFO 234.

The positive-polarity FIFO 212 receives and holds the non-LPP sync pattern portion of positive polarity of the equalized digital RF signal P5 in accordance with the control of the control unit 290. Further, when the RF signal P5 corresponds to the LPP-present sync pattern, the positive-polarity FIFO 212 outputs the held non-LPP sync pattern portion of positive polarity to a selector 220.

The negative-polarity FIFO 214 receives and holds the non-LPP sync pattern portion of negative polarity of the equalized digital RF signal P5 in accordance with the control of the control unit 290. Further, when the RF signal P5 corresponds to the LPP-present sync pattern, the negative-polarity FIFO 214 outputs the held non-LPP sync pattern portion of negative polarity to the selector 220.

The selector 220 outputs the output (non-LPP sync pattern portion of positive polarity) from the positive-polarity FIFO 212 or the output (non-LPP sync pattern portion of negative polarity) from the negative-polarity FIFO 214 to the subtractor 230 in response to a control signal crt1 from the control unit 290.

In accordance with the control of the control unit 290, the non-LPP sync pattern portion of positive polarity output from the positive-polarity FIFO 212 and the LPP-present sync pattern portion of positive polarity obtained immediately after the non-LPP sync pattern portion of positive polarity, which is received by the positive-polarity FIFO 212, are supplied to the subtractor 230 at the same timing.

Similarly, in accordance with the control of the control unit 290, the non-LPP sync pattern portion of negative polarity output from the negative-polarity FIFO 214 and the LPP-present sync pattern portion of negative polarity obtained immediately after the non-LPP sync pattern portion of negative polarity, which is received by the negative-polarity FIFO 214, are supplied to the subtractor 230 at the same timing.

Thus, the subtractor 230 sequentially obtains the difference in signal level between the LPP-present sync pattern portion of positive polarity and the non-LPP sync pattern portion of positive polarity, and the difference in signal level between the LPP-present sync pattern portion of negative polarity and the non-LPP sync pattern portion of negative polarity, and outputs the differences to the filter 232.

The first averaging unit 231 including the filter 232 and the difference FIFO 234 functions as a primary IIR filter. The first averaging unit 231 updates the memory contents of the difference FIFO 234 and executes averaging processing in accordance with a control signal ctr2 from the control unit 290 every time the LPP-present sync pattern is received. Then, the difference FIFO 234 outputs the average difference D.

The subtractor 182 of the correction execution unit 180 performs subtraction processing for subtracting the average difference D from the signal level on the equalized digital RF signal P5, and outputs the subtraction result to the selector 184.

The selector 184 outputs the equalized digital RF signal P5 or outputs the signal received from the subtractor 182 in accordance with a control signal ctr3 from the control unit 290. Specifically, when the control signal ctr3 indicates that "no correction is to be made", which corresponds to the fact that the LPP has not been detected, the selector 184 outputs the equalized digital RF signal P5. Meanwhile, when the control signal ctr3 indicates that "correction is to be made", which corresponds to the fact that the LPP has been detected, the selector 184 outputs the signal received from the subtractor 182.

In short, the correction execution unit 180 performs correction processing for eliminating the effect of the LPP on the RF signal at the timing at which the LPP is detected.

Note that the control unit 290 performs the control operations as described above based on the sync detection signal P8 from the binarization unit 138.

The optical disk device according to the second exemplary embodiment also performs correction processing for eliminating the effect of the LPP on the RF signal, thereby suppressing the occurrence of errors at the time of binarization, as with the optical disk device 100.

Figure 15:
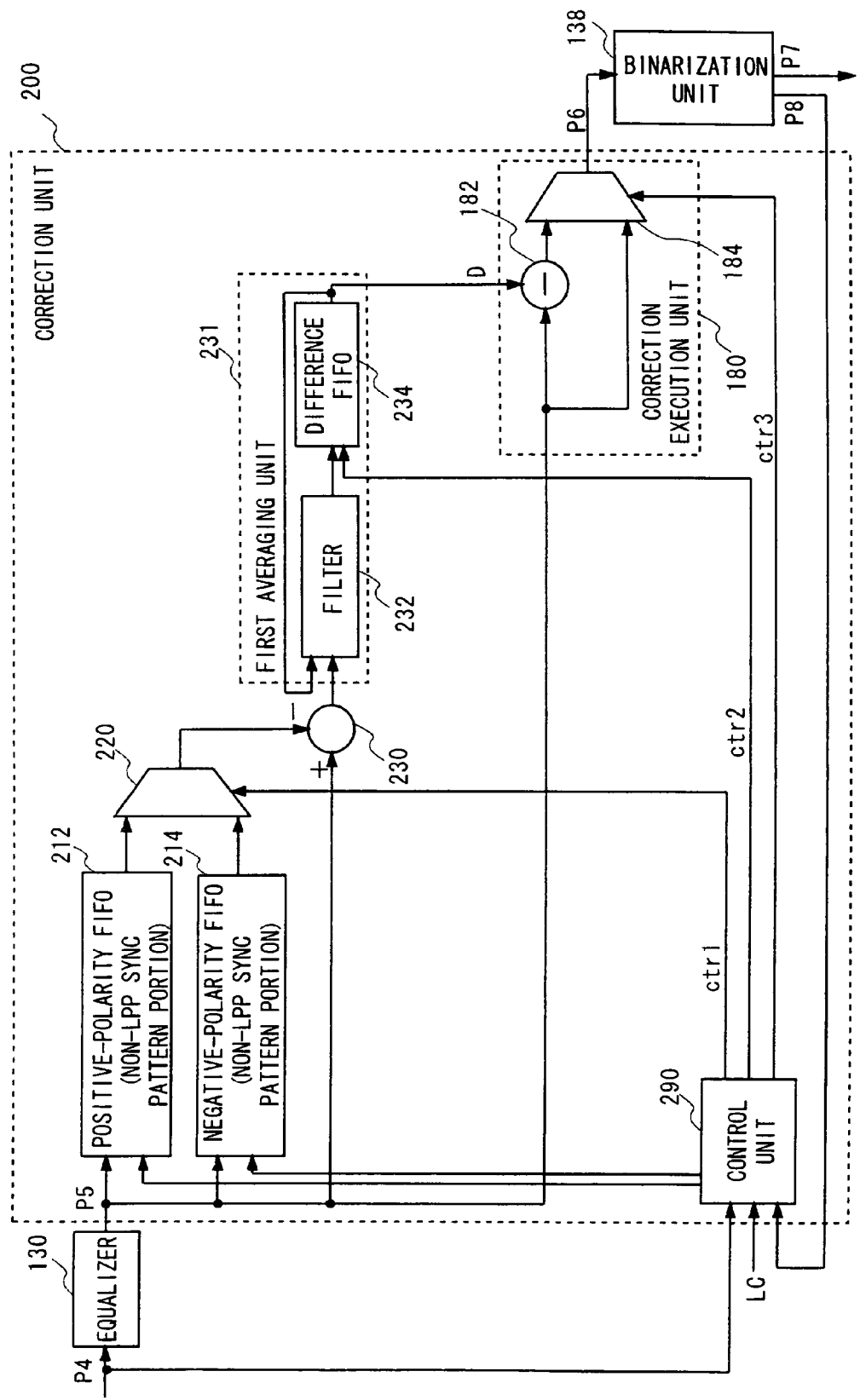
FIG. 15 is a diagram showing a correction unit of an optical disk device according to a second exemplary embodiment of the present invention.
Figure 16:
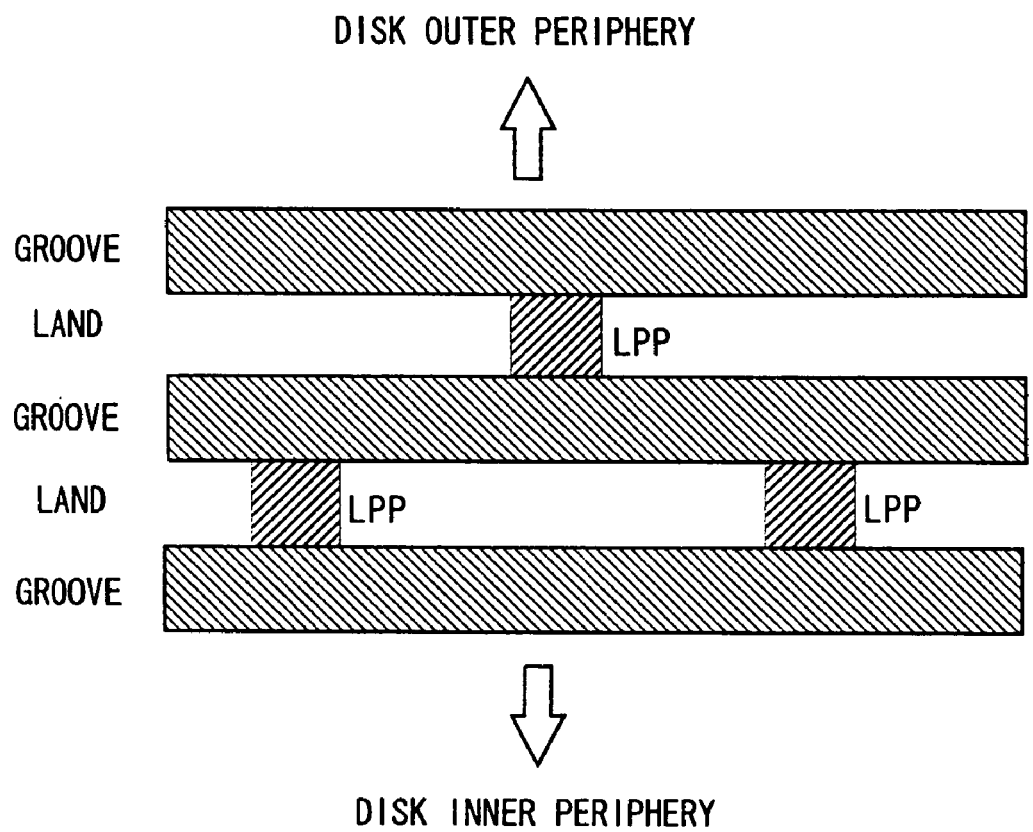
FIG. 16 is a diagram showing an optical disk compliant with DVD-R/RW standards.
Figure 17:
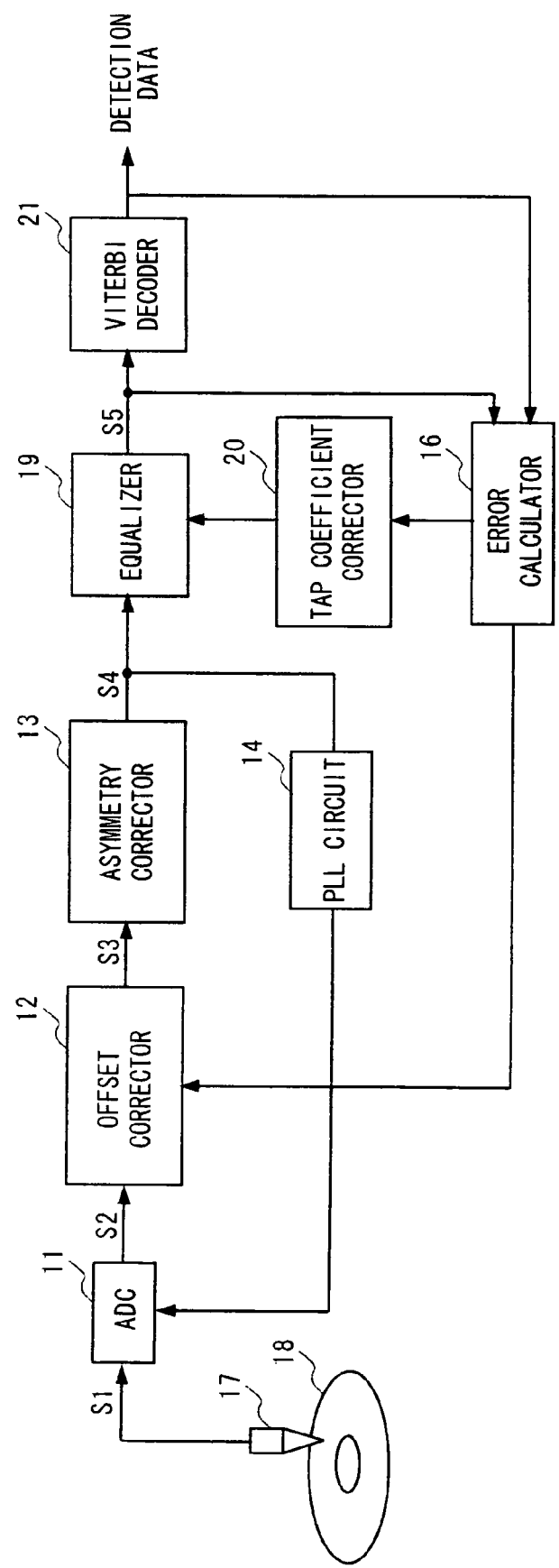
FIG. 17 is a diagram showing an optical disk device according to a related art.

Further, as shown in FIG. 15, the correction unit 200 of the optical disk device according to the second exemplary embodiment is capable of further reducing the number of filters and FIFOs and further reducing the circuit size compared to the correction unit 140 shown in FIG. 12.

In the two exemplary embodiments described above, the correction unit is located immediate upstream of the binarization unit that performs binarization processing on the RF signal. This eliminates the need to provide a circuit for delaying the RF signal by an amount corresponding to the time for calculating a difference to be used for correction, thereby reducing the circuit size. The timing for performing correction processing on the RF signal, i.e., the position of the correction unit may be set at any stage before the binarization unit.

In the optical disk device 100 according to the first exemplary embodiment, the difference set obtained by the 14T sync pattern portion of positive polarity and the difference set obtained by the 14T sync pattern portion of negative polarity are averaged, and the average value thus obtained is used as a correction value. Alternatively, the difference set may be calculated using one of the 14T sync pattern portion of positive polarity and the 14T sync pattern portion of negative polarity, and the difference set may be used for the correction for each polarity.

The same holds true to the optical disk device according to the second exemplary embodiment.

Further, in the optical disk device 100 according to the first exemplary embodiment, the difference set is calculated using the 14T sync pattern portion averaged in the time direction by the IIR filter. Alternatively, as in the optical disk device of the second exemplary embodiment, the difference sets calculated using the 14T sync pattern portion may be averaged in the time direction.

In the optical disk device according to the second exemplary embodiment, each of the positive-polarity FIFO 212 and the negative-polarity FIFO 214 stores data corresponding to the non-LPP sync pattern portion as shown in FIG. 15O. Alternatively, each of the positive-polarity FIFO 212 and the negative-polarity FIFO 214 may store data corresponding to the LPP-present sync pattern portion, and the filter 232 and the FIFO 234 may execute the averaging processing every time the non-LPP sync pattern portion is received.

Also, in the optical disk devices according to the two exemplary embodiments described above, the RF signal is corrected every time the LPP is detected. Accordingly, the 14T sync pattern portion of the RF signal obtained at the timing at which the first bit of the LPP set is detected is also corrected. In comparison with the user data, the 14T sync pattern portion hardly causes an error at the time of binarization even if the 14T sync pattern portion is affected by the LPP. Therefore, the correction may be performed only on the user data portion of the RF signal. In other words, the correction may be performed in response to the detection of the second and third bits of the LPP.

Further, in the optical disk devices according to the two exemplary embodiments described above, the correction may be performed only when the quantified amount of distortion exceeds a certain threshold set in advance.

Furthermore, in the optical disk devices according to the two exemplary embodiments described above, there is a possibility that the sync detection signal P8 serving as the reference signal for the control units 190 and 290 operates at a false position due to erroneous detection or the like in the case where a synchronous state is not established. Therefore, the correction execution unit may be configured to operate only in the case where the synchronous state is established, to thereby improve the stability.

Moreover, in the optical disk devices according to the two exemplary embodiments described above, the polarity of the 14T sync pattern portion is determined using the RF signal before the equalization processing. Alternatively, the polarity of the 14T sync pattern portion may be determined using the RF signal after the equalization processing.

In each of the first averaging units 141 and 231 of the optical disk devices according to the two exemplary embodiments described above, an FIFO and a filter constitute an IIR filter in order to reduce the circuit size and simplify the timing control. Alternatively, a typical IIR filter may be used.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Further, the first and second exemplary embodiments can be combined as desirable by one of ordinary skill in the art.

Furthermore, it is noted that, Applicant's intent is to encompass equivalents of all claim elements, even if amended later during prosecution.

What is claimed is:

1. An optical disk device that reproduces reproduction information recorded in a groove of an optical disk compliant with DVD-R/RW standards, comprising:
   an RF signal generation unit that reads information from the groove and generates an RF signal;
   an LPP detection unit that detects a land prepit (LPP) from a wobble signal;
   a difference calculation unit that obtains a difference set, assuming that a sync pattern portion obtained when the LPP detection unit detects the LPP is an LPP-present sync pattern portion and that a sync pattern portion obtained when the LPP detection unit detects no LPP is a non-LPP sync pattern portion, at a timing when the sync pattern portion is positioned at the head of a sync frame of the RF signal, by performing processing of calculating a difference in signal level between the LPP-present sync pattern portion and the non-LPP sync pattern portion having the same polarity; and
   a correction execution unit that executes correction on the RF signal at the timing when the LPP detection unit detects the LPP, by using a calculation result of the difference calculation unit.

2. The optical disk device according to claim 1, further comprising a binarization unit that performs binarization processing on the RF signal,
   wherein the correction execution unit is located immediate upstream of the binarization unit.

3. The optical disk device according to claim 1, further comprising a first averaging unit that averages signal levels of LPP-present sync pattern portions having the same polarity and signal levels of non-LPP sync pattern portions having the same polarity as the LPP-present sync pattern portions,
    wherein the difference calculation unit obtains the difference set by using a signal level obtained after the first averaging unit averages the signal levels of the LPP-present sync pattern portions and the signal levels of the non-LPP sync pattern portions.

4. The optical disk device according to claim 2, further comprising a first averaging unit that averages signal levels of LPP-present sync pattern portions having the same polarity and signal levels of non-LPP sync pattern portions having the same polarity as the LPP-present sync pattern portions,
    wherein the difference calculation unit obtains the difference set by using a signal level obtained after the first averaging unit averages the signal levels of the LPP-present sync pattern portions and the signal levels of the non-LPP sync pattern portions.

5. The optical disk device according to claim 1, further comprising a first averaging unit that averages difference sets in a time direction, the difference sets being obtained by the difference calculation unit,
    wherein the correction execution unit executes the correction by using the difference set averaged by the first averaging unit.

6. The optical disk device according to claim 2, further comprising a first averaging unit that averages difference sets in a time direction, the difference sets being obtained by the difference calculation unit,
    wherein the correction execution unit executes the correction by using the difference set averaged by the first averaging unit.

7. The optical disk device according to claim 3, wherein the first averaging unit comprises an IIR filter including a filter and an FIFO.

8. The optical disk device according to claim 4, wherein the first averaging unit comprises an IIR filter including a filter and an FIFO.

9. The optical disk device according to claim 5, wherein the first averaging unit comprises an IIR filter including a filter and an FIFO.

10. The optical disk device according to claim 6, wherein the first averaging unit comprises an IIR filter including a filter and an FIFO.

11. The optical disk device according to claim 1, wherein the difference calculation unit calculates the difference set for each polarity and averages difference sets calculated for each polarity.

12. The optical disk device according to claim 1, further comprising a recording unit that records reproduction information,
    wherein the LPP detection unit detects the LPP also during recording by the recording unit.

13. The optical disk device according to claim 1, wherein the correction execution unit executes the correction on condition that a value obtained by quantifying a calculation result of the difference calculation unit is equal to or greater than a predetermined threshold.

14. The optical disk device according to claim 1, further comprising a sync pattern timing estimation unit that estimates a subsequent timing of the sync pattern portion based on a timing of the sync pattern portion previously detected from the RF signal.

15. The optical disk device according to claim 1, wherein the correction execution unit executes the correction after synchronization of the RF signal is established.

16. The optical disk device according to claim 1, wherein the correction execution unit executes the correction only on a user data portion of the RF signal.

* * * * *